United States Patent
Yamaguchi et al.

(10) Patent No.: US 8,264,738 B2
(45) Date of Patent: Sep. 11, 2012

(54) IMAGE FORMING APPARATUS, IMAGE FORMING METHOD, AND COMPUTER-READABLE STORAGE MEDIUM FOR IMAGE FORMING PROGRAM

(75) Inventors: Tomohiro Yamaguchi, Shinshiro (JP); Takayuki Nabeshima, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 715 days.

(21) Appl. No.: 12/402,616

(22) Filed: Mar. 12, 2009

(65) Prior Publication Data

US 2009/0316161 A1 Dec. 24, 2009

(30) Foreign Application Priority Data

Jun. 18, 2008 (JP) ................. 2008-159504

(51) Int. Cl.
G06F 15/00 (2006.01)
G06K 9/46 (2006.01)
(52) U.S. Cl. ......................... 358/1.2; 382/190
(58) Field of Classification Search .............. 358/1.1, 358/1.13, 1.2; 382/190
See application file for complete search history.

(56) References Cited

U.S. PATENT DOCUMENTS

| | | |
|---|---|---|
| 2001/0021279 A1 | 9/2001 | Nakajima et al. |
| 2004/0066969 A1 | 4/2004 | Aihara |
| 2006/0114484 A1 | 6/2006 | Kitora |
| 2007/0133031 A1* | 6/2007 | Takaragi et al. ............. 358/1.13 |
| 2007/0133074 A1 | 6/2007 | Fabrice |
| 2008/0104707 A1 | 5/2008 | Saka et al. |
| 2008/0123157 A1 | 5/2008 | Kinoshita |

FOREIGN PATENT DOCUMENTS

| | | |
|---|---|---|
| JP | 10-214350 | 8/1998 |
| JP | 11-187247 A | 7/1999 |
| JP | 2001-203876 | 7/2001 |
| JP | 2003-046746 | 2/2003 |
| JP | 2003-337687 A | 11/2003 |
| JP | 2004-046632 | 2/2004 |
| JP | 2004-312534 | 11/2004 |
| JP | 2006-080989 | 3/2006 |
| JP | 2006-093978 | 4/2006 |
| JP | 2006-155381 | 6/2006 |
| JP | 2007-013581 A | 1/2007 |
| JP | 2007-150858 | 6/2007 |
| JP | 2008-118215 | 5/2008 |
| JP | 2008-134314 | 6/2008 |

OTHER PUBLICATIONS

Notification of Reason(s) for Refusal issued in the corresponding Japanese Patent Application No. 2008-159504 dated Apr. 20, 2010, and an English Translation thereof.
Decision of Refusal dated Jul. 20, 2010, issued in the corresponding Japanese Patent Application No. 2008-159504, and its partial English Translation thereof.

* cited by examiner

Primary Examiner — Saeid Ebrahimi Dehkordy
(74) Attorney, Agent, or Firm — Buchanan Ingersoll & Rooney PC (57) ABSTRACT

An image forming apparatus is provided with a scanner that reads a document and generates image data thereof, an information detecting portion that detects, from the image data generated by the scanner, attribute information about areas divided in accordance with a type of an image, a resolution converting portion that modifies the image data for each of the areas by performing a resolution converting process on the image in accordance with instructions that are provided by a user based on the attribute information detected by the information detecting portion, an image replacement processing portion, and a printer that prints an image based on the image data thus modified on a recording medium.

15 Claims, 8 Drawing Sheets

IMAGE FORMING APPARATUS, IMAGE FORMING METHOD, AND COMPUTER-READABLE STORAGE MEDIUM FOR IMAGE FORMING PROGRAM

This application is based on Japanese Patent Application No. 2008-159504 filed on Jun. 18, 2008, the contents of which are hereby incorporated by reference.

BACKGROUND OF THE INVENTION

1. Field of the Invention

The present invention relates to an image forming apparatus such as an MFP, an image forming method, and a computer-readable storage medium for image forming program.

2. Description of Related Art

Image forming apparatus for forming images such as a copying machine, a printer, and a facsimile and, in addition, multi function peripheral known as a combination machine or an MFP (Multi Function Peripheral) have been traditionally used in the offices of business and the like.

Along with the improvement in the performance of the image forming apparatuses, ceaseless development of additional functions has been continued, and various additional functions have been proposed. For example, the followings are such proposed functions. In accordance with predetermined adding conditions of specific image information, the specific image information is embedded in image data meeting the adding conditions in a manner specified by the adding conditions. When a printed image having specific image information embedded therein is duplicated by a copying machine, the copying machine, upon detecting the specific image information, prevents the duplicate print from being outputted, or prints characters such as "Copying Prohibited" and outputs the result (JP-2007-013581-A). As a similar function, there is also proposed a function to embed, in a copy, security information with which illegal copying will be prevented (JP-2003-337687-A).

The following function is further proposed. Information concerning setting conditions for copying is embedded in the document in advance. When the document is duplicated, the information concerning setting conditions thus embedded is read out. Then, copying is performed based on the setting conditions (JP-H11-187247-A). With this arrangement, the operator does not need to make renewed settings for various functions, thereby leading to a reduction in operation mistakes and the time required for such a job as well.

However, according to the methods proposed in JP-2007-013581-A, JP-2003-337687-A, and JP-H11-187247-A, when a document, including images consisting of photographs, graphics such as graphs, or text, is copied, it is impossible to edit such images. For example, in a document consisting of a photograph, a graph, and text, if the graph is formed smaller and the photograph is formed larger, a user may wish to take a look at an enlarged graph. In that case, it is possible to make a usual enlarged copy to thereby enlarge the graph. However, other areas than where the graph is located are also enlarged. As a result, the text or the photograph partially comes off the copy unnecessarily. Even if the area to be viewed is enlarged and duplicated, accurate positioning or magnification settings are difficult to make to thereby possibly prevent a desired output image from being produced.

SUMMARY OF THE INVENTION

In light of the problem described above, an object of the present invention is to make it possible to facilitate easier and appropriate editing of images on the document for copying.

According to one embodiment of the present invention, an image forming apparatus includes a reading portion that reads a document and generates image data; an information detecting portion that detects, from the image data generated by the reading portion, attribute information about areas divided in accordance with a type of an image; a modifying portion that modifies the image data for each of the areas by performing a resolution converting process on the image in accordance with instructions that are provided by a user based on the attribute information detected by the information detecting portion; and a printer that prints an image based on the image data modified by the modifying portion on a recording medium.

DETAILED DESCRIPTION OF PREFERRED EMBODIMENTS

Figure 1:
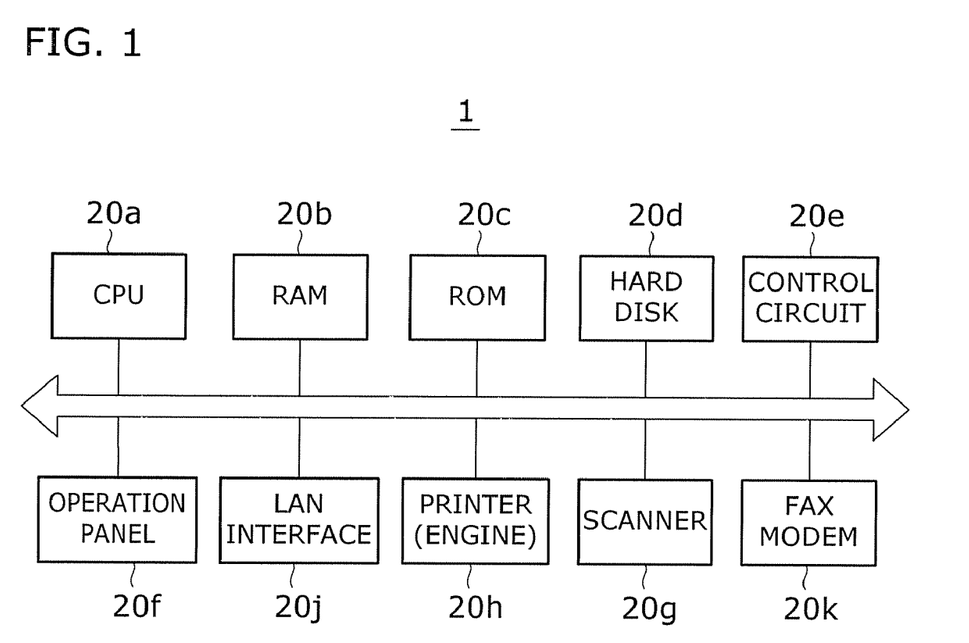
FIG. 1 is a diagram showing an example of a hardware configuration of an image forming apparatus.
Figure 2:
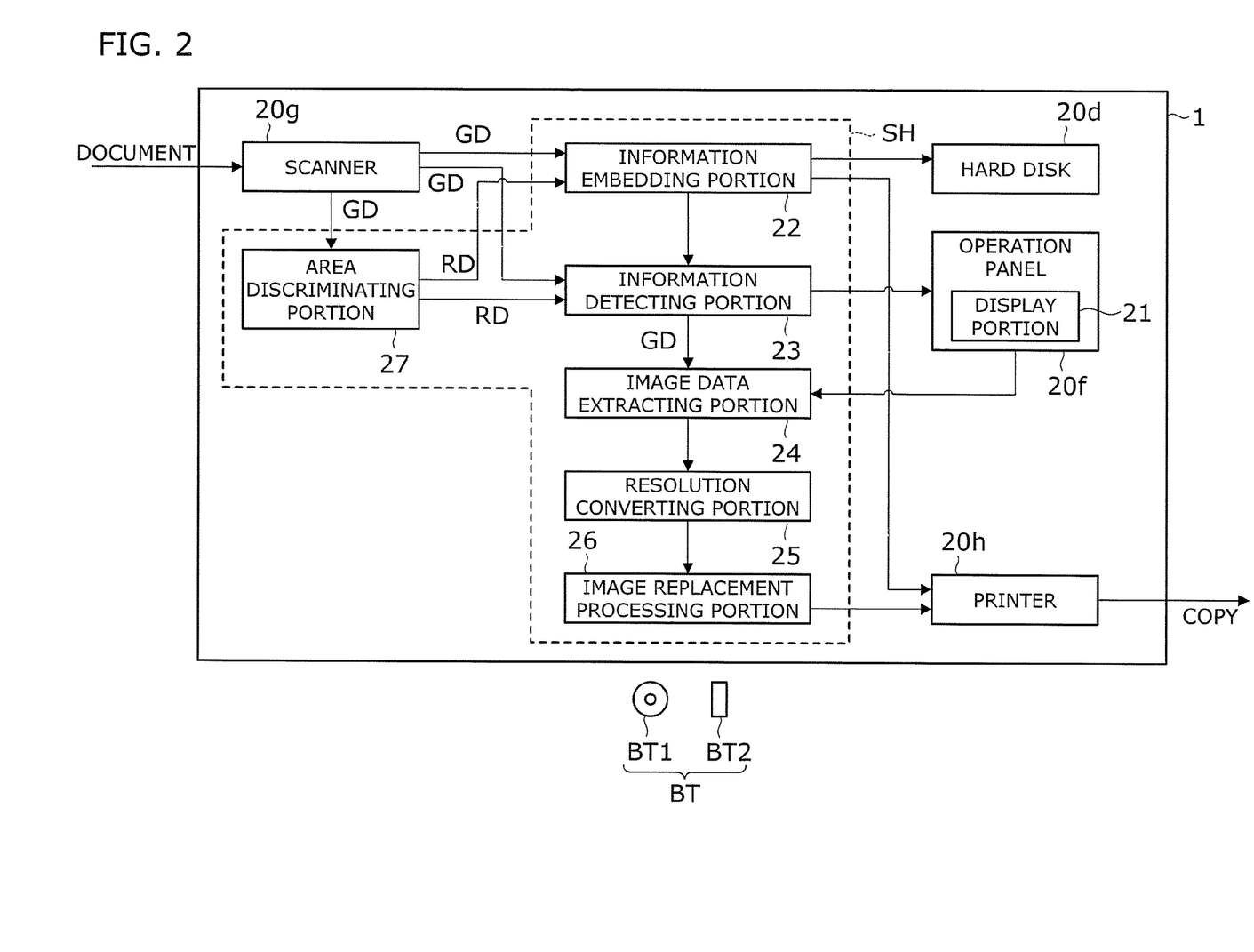
FIG. 2 is a diagram showing an example of a functional configuration of an image forming apparatus.
Figure 3:
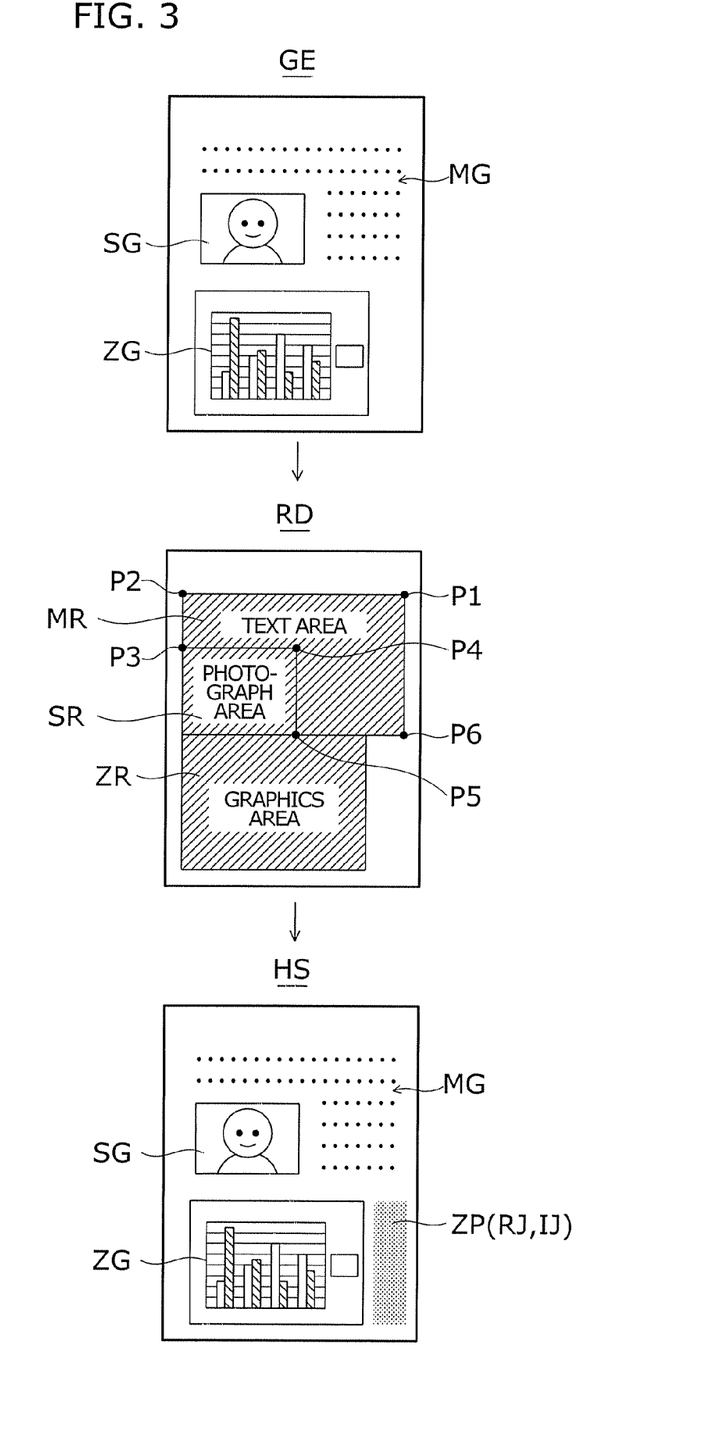
FIG. 3 is a diagram showing an example of a method to embed area attribute information and position information in a document.
Figure 4:
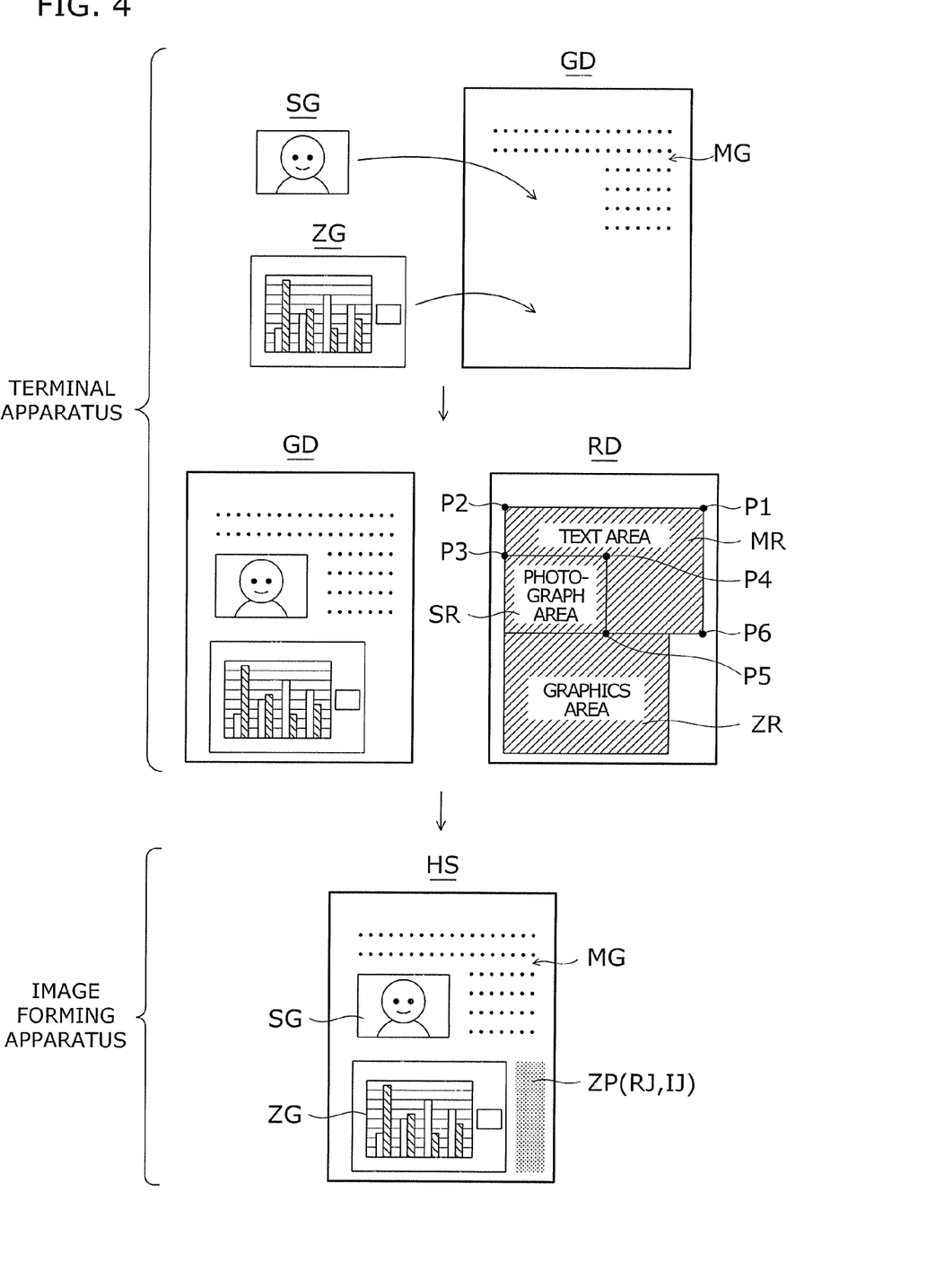
FIG. 4 is a diagram showing another example of a method to embed area attribute information and position information in a document.

FIG. 1 is a diagram showing an example of a hardware configuration of an image forming apparatus 1; FIG. 2 is a diagram showing an example of a functional configuration of the image forming apparatus 1; FIG. 3 is a diagram showing an example of a method to embed area attribute information and position information in a document; and FIG. 4 is a diagram showing another example of a method to embed area attribute information and position information in a document.

An image forming apparatus 1 is a processing apparatus integrating various functions such as copying, scanning, facsimile, network printing, and document server. The image forming apparatus 1 is sometimes called a combination machine or an MFP (Multi Function Peripheral).

The "document server" is a function for providing and managing storage areas which are called "personal boxes" or "boxes" and correspond to folders, directories, or the like in personal computers. It is sometimes called "box function". A user can store image data etc. as a file in his personal box.

The image forming apparatus 1 is installed in offices of public organizations (governments and municipalities), offices of business, public facilities such as schools or libraries, or various places of other kinds, and can be shared by a plurality of users.

As shown in FIG. 1, the image forming apparatus 1 includes a CPU 20a, a RAM 20b, a ROM 20c, a hard disk 20d, a control circuit 20e, an operation panel 20f, a scanner 20g, a printer (engine) 20h, a LAN interface 20j, and a fax modem 20k.

The control circuit 20e is a circuit for controlling the hard disk 20d, the operation panel 20f, the scanner 20g, the printer 20h, the LAN interface 20j, the fax modem 20k, and the like.

The scanner 20g optically reads images of the contents in the document such as text, equations, symbols, photographs, diagrams, or illustrations, and generates image data.

The printer 20h prints, on a paper (recording medium), an image based on the image data obtained by the scanner 20g.

The LAN interface 20j is a NIC (Network Interface Card) for communicating with other image forming apparatus or the like and used for connecting the image forming apparatus 1 to a hub or a rooter.

The fax modem 20k is a unit that communicates with other image forming apparatus, a facsimile terminal, or the like by fax protocol.

The operation panel 20f is configured of a display portion 21, which will be described later, formed of a touch-panel liquid crystal display and an operation portion formed of numeric keys etc. The display portion 21 displays a screen for providing a user with messages or instructions, a screen for a user to input a type of desired process and processing conditions, and a screen for showing a result of process executed by the CPU 20a etc.

The user, by watching the screens and performing operation on the display portion 21 or the operation portion, can give instructions such as starting or canceling the execution of process, specify processing conditions such as the destination of data, printing conditions, or scanning conditions, and also specify various other items. This means that the operation panel 20f serves as a user interface for the user to operate the image forming apparatus 1.

As shown in FIG. 2, the image forming apparatus 1 includes an information embedding portion 22, an information detecting portion 23, an image data extracting portion 24, a resolution converting portion 25, an image replacement processing portion 26, an area discriminating portion 27, and the like.

The information embedding portion 22, the information detecting portion 23, the image data extracting portion 24, the resolution converting portion 25, the image replacement processing portion 26, and the area discriminating portion 27 are functionally realized by the CPU 20a, the RAM 20b, the ROM 20c, and a processing portion SH formed of other peripheral devices. The processing portion SH is capable of operating as a computer. A whole or part of CPU 20a etc. is sometimes formed as an LSI in a form of microcomputer or ASIC (Application Specific Integrated Circuit).

The processing portion SH incorporates a computer program for realizing each of the functions of the information embedding portion 22, the information detecting portion 23, the image data extracting portion 24, the resolution converting portion 25, the image replacement processing portion 26, and the area discriminating portion 27. Such a program can be installed from a portable recording medium BT including a recording medium BT1 such as a CD-ROM, a DVD-ROM, or the like having the program recorded therein or a recording medium BT2 such as a semiconductor memory having the program recorded therein. It is also possible to download the program from the network or the server.

Hereinafter, a description will be given of the operation of each of the above-mentioned portions when the attribute information for areas divided in accordance with the image types, i.e., the area attribute information and the position information, is embedded in the document having an image including a photograph, a graph, and text formed thereon. The area attribute information and the position information will be described later.

First, a document is read by the scanner 20g, and image data GD is generated.

The area discriminating portion 27 discriminates among areas based on the image data GD generated by the scanner 20g to thereby generate area attribute data RD. For example, as shown in FIG. 3, the area discriminating portion 27 discriminates among areas based on the image data GD of a document GE having a text image MG, a photograph image SG, and a graphics image ZG including a graph formed thereon. Then, the area attribute data RD including information for a text area MR corresponding to the text image MG, information for a photograph area SR corresponding to the photograph image SG, and information for a graphics area ZR corresponding to the graphics image ZG.

The information embedding portion 22 adds area attribute information RJ and position information IJ to the image data GD based on the area attribute data RD generated by the area discriminating portion 27. Then, the printer 20h prints on a paper an image based on the image data GD to which the area attribute information RJ and the position information IJ are added. As shown in FIG. 3, the text image MG, the photograph image SG, and the graphics image ZG are formed on a copy HS obtained as a result of printing by the printer 20h, and the area attribute information RJ and the position information IJ are also formed thereon in a form of a background pattern ZP. Instead of the background pattern ZP, it is also possible to employ a bar code, a QR code (registered trademark), or a watermark technique to embed the area attribute information RJ and the position information IJ.

The above-mentioned area attribute information RJ is the information indicating the attributes of the text image MG, the photograph image SG, and the graphics image ZG.

The above-mentioned position information IJ is the information that indicates positions in which the text image MG, the photograph image SG, and the graphics image ZG are individually formed on the paper. In this embodiment, the position information IJ is two-dimensional coordinates information. For example, as shown in FIG. 3, the position information IJ for the text area MR represented by the text image MG is two-dimensional coordinates information having angular points P1 to P6 that together form the text area MR. The same is applied to the position information IJ for the photograph area SR and the graphics area ZR.

It is also possible to embed the area attribute information RJ and the position information IJ in the following manner. As shown in FIG. 4, the user generates the image data GD including the text image MG, the photograph image SG, and the graphics image ZG by using predetermined application software installed in a terminal apparatus in advance. Then, the user generates the area attribute data RD by way of application software (printer driver). These image data GD and area attribute data RD are transmitted to the image forming apparatus 1 through a communication line. The image forming apparatus 1, in the same manner as described earlier, adds the area attribute information RJ and the position information IJ to the image data GD based on the area attribute data RD, and produces a copy HS.

Next, a description will be given of the operation of each of the portions to obtain a copy by editing an image when a document having the area attribute information RJ and the position information IJ embedded therein is copied.

Figure 5:
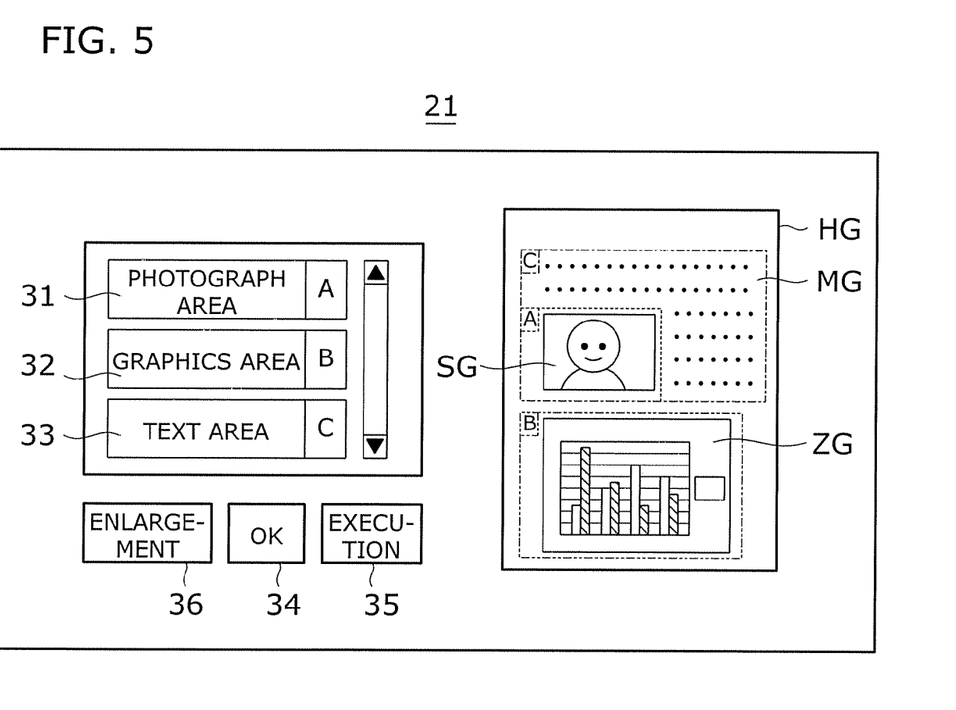
FIG. 5 is a diagram showing an example of a display portion displaying a setting screen for editing images.
Figure 6:
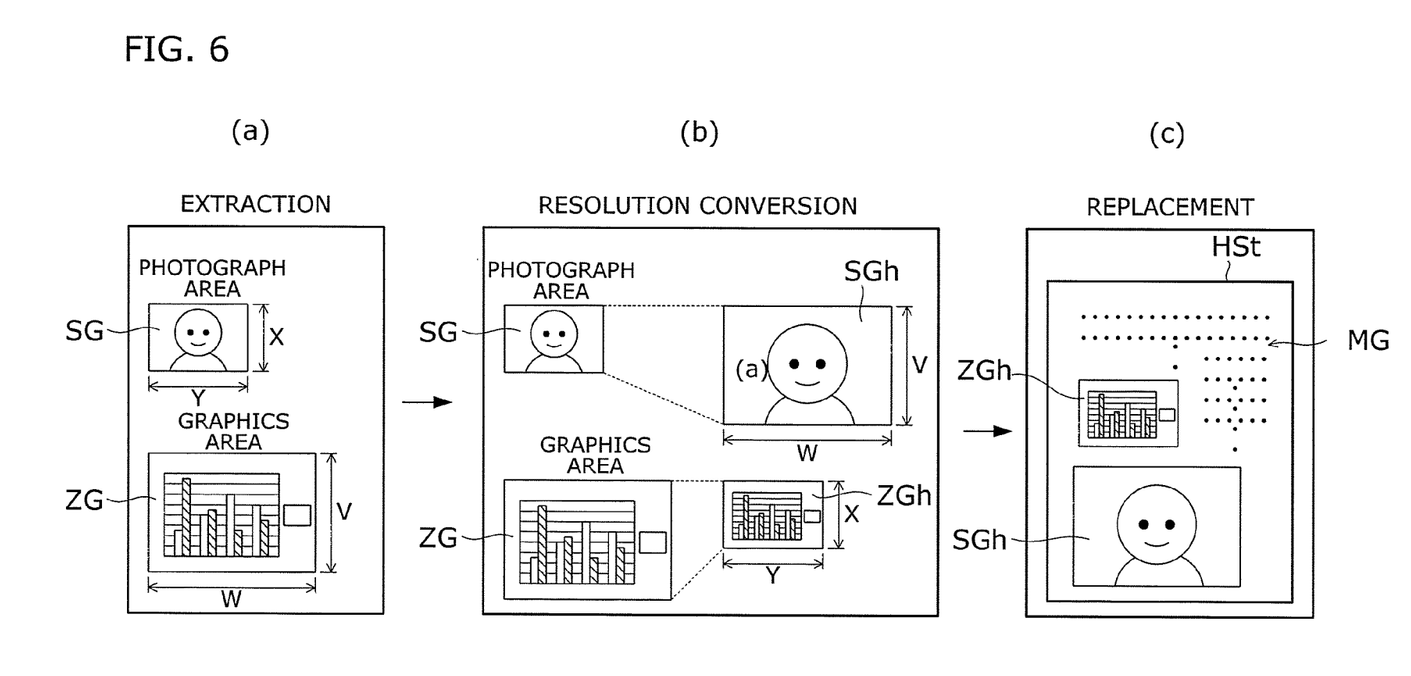
FIG. 6 is a diagram showing an example of a conception depicting operation of each portion when images are edited.
Figure 7:
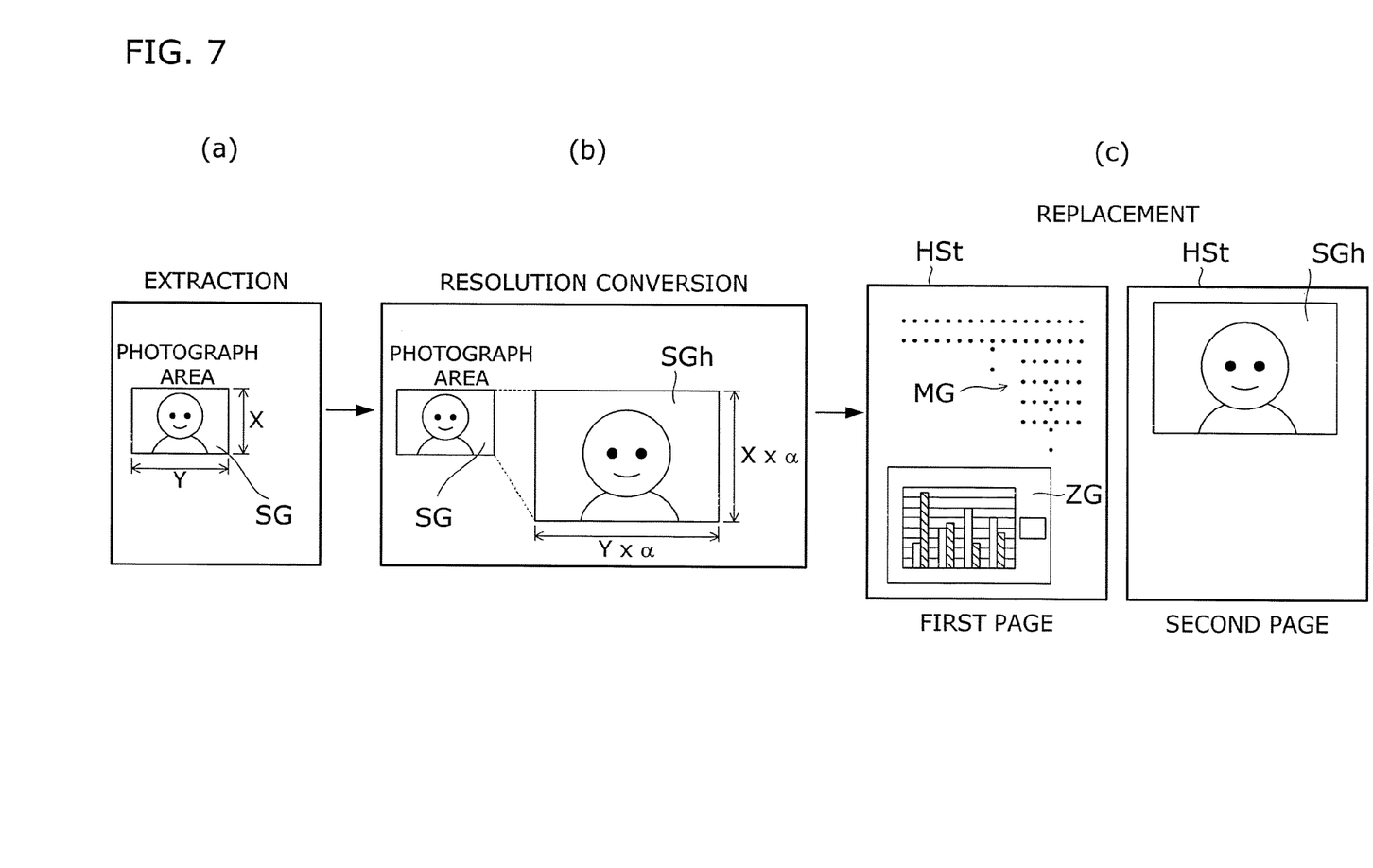
FIG. 7 is a diagram showing another example of a conception depicting operation of each portion when images are edited.

FIG. 5 is a diagram showing an example of the display portion 21 displaying a setting screen for editing images; FIG. 6 is a diagram showing an example of a conception depicting operation of each portion when images are edited; and FIG. 7 is a diagram showing another example of a conception depicting operation of each portion when images are edited.

As an original document, the copy HS embedded with the area attribute information RJ and the position information IJ is read by the scanner 20g in a manner described above, and image data GD is generated.

The area discriminating portion 27 discriminates among areas based on the image data GD generated by the scanner 20g and generates the area attribute data RD.

The information detecting portion 23 detects, from the image data GD, attribute information, i.e., the area attribute information RJ and the position information IJ, about the areas discriminated in accordance with the types of images.

Then, the information detecting portion 23 determines, from the area attribute information RJ thus detected, whether or not a text image MG, a photograph image SG, and a graphics image ZG are present. This means that the information detecting portion 23 discriminates among attributes included in the image data GD and makes the display portion 21 display a screen for identifying and selecting the attributes.

In this process, the display portion 21 displays a copied image HG read out from the copy HS by the scanner 20g and, at the same time, displays a photograph selection button 31, a graphics selection button 32, a text selection button 33, a confirmation button 34, an execution button 35, and an enlargement button 36.

The copied image HG displayed on the display portion 21 includes the text image MG, the photograph image SG, and the graphics image ZG.

Here, the user selects, from among the text image MG, the photograph image SG, and the graphics image ZG, images of which sizes and positions are swapped.

For example, if the user wishes to apply the size and the forming position of the photograph image SG to the graphics image ZG to reproduce the graphics image ZG, and apply the size and the forming position of the graphics image ZG to the photograph image SG to reproduce the photograph image SG, the user presses the photograph selection button 31 and the graphics selection button 32. Here, when the photograph selection button 31 and the graphics selection button 32 are pressed by the user, colors of the photograph selection button 31 and the graphics selection button 32 are inverted and indicated.

The user presses the confirmation button 34 to confirm the selection and presses the execution button 35 to execute the process.

When the operation by the user described above is performed, the image data extracting portion 24 extracts the information of the photograph image SG and the graphics image ZG, as shown in section (c) in FIG. 6. It is assumed that a height and a width of the extracted photograph image SG are X and Y, respectively, and a height and a width of the extracted graphics image ZG are V and W, respectively.

The resolution converting portion 25 performs a resolution conversion on the extracted photograph image SG so as to apply thereto the original size of the graphics image ZG and performs a resolution conversion on the extracted graphics image ZG so as to apply thereto the original size of the photograph image SG, as shown in section (b) in FIG. 6.

To be more specific, the resolution converting portion 25 enlarges the height X of the photograph image SG to the same height as the height V of the graphic image ZG and the width Y of the photograph image SG to the same width as the width W of the graphic image ZG.

In addition, the resolution converting portion 25 reduces the height V of the graphics image ZG down to the same height as the original height X of the photograph image SG and the width W of the graphics image ZG down to the same width as the original width Y of the photograph image SG.

In this way, a converted photograph image SGh is obtained by performing a resolution conversion (enlargement) on the photograph image SG, and a converted graphics image ZGh is obtained by performing a resolution conversion (reduction) on the graphics image ZG.

As shown in section (c) in FIG. 6, the image replacement processing portion 26 forms the converted photograph image SGh in an original position where the graphics image ZG before conversion was formed and forms the converted graphics image ZGh in an original position where the photograph image SG before conversion was formed. Then, the printer 20h outputs a copy HSt having the converted photograph image SGh and the converted graphics image ZGh formed thereon as described above.

The following process is performed if the user wishes to enlarge and print on a separate paper one image out of the text image MG, the photograph image SG, and the graphics image ZG.

For example, if the user wishes to enlarge and print on a separate paper the photograph image SG, the user presses the enlargement button 36 and, thereafter, the photograph selection button 31 followed by the confirmation button 34 and the execution button 35 in the same manner as described above.

Then, as shown in section (a) in FIG. 7, the image data extracting portion 24 extracts the photograph image SG. In the same manner as described previously, it is assumed that a height and a width of the extracted photograph image SG are X and Y, respectively.

As shown in section (b) in FIG. 7, the resolution converting portion 25 performs a resolution conversion on the extracted photograph image SG so that the resultant image fits into the size of the paper. To be more specific, when printing is set for portrait orientation, the resolution converting portion 25 enlarges the width Y of the photograph image SG to a size obtained by $Y \times \alpha$ (where $\alpha$ is any given integer) but within a printable area of the paper and enlarges the height X of the photograph image SG to a size obtained by $X \times \alpha$. When printing is set for landscape orientation, the resolution converting portion 25 enlarges the height X of the photograph image SG to a size obtained by $X \times \beta$ (where $\beta$ is any given integer) but within a printable area of the paper and enlarges the width Y of the photograph image SG to a size obtained by $Y \times \beta$.

In this way, the converted photograph image SGh is obtained by performing a resolution conversion (enlargement) on the photograph image SG.

As shown in section (c) in FIG. 7, the image replacement processing portion 26 forms the text image MG and the graphics image ZG on the first page and the converted photograph image SGh on the second page. Then, the printer 20h outputs a copy HSt containing the first page having the text image MG and the graphics image ZG formed thereon and the second page having the converted photograph image SGh formed thereon. Here, the original photograph image SG before conversion may be formed on the first page.

Figure 8:
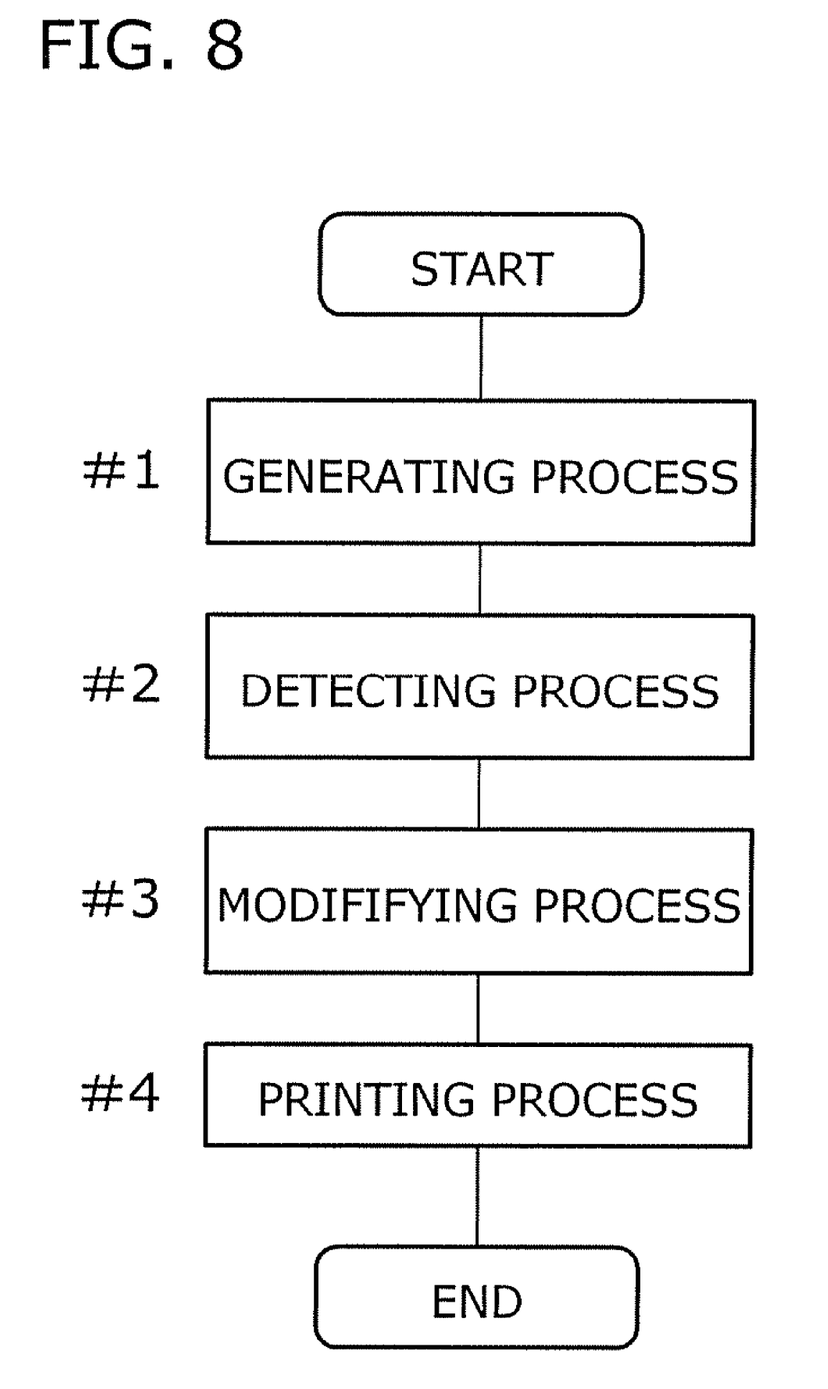
FIG. 8 is a flowchart for explaining a flow of modifying process of image data.

FIG. 8 is a flowchart for explaining a flow of modifying process of the image data GD.

As shown in FIG. 8, first, the original document is read to generate the image data GD (Step 1). Next, the attribute information, i.e., the area attribute information RJ and the position information IJ, is detected from the generated image data GD for the areas discriminated in accordance with the types of images (Step 2). Then, in accordance with the instructions by the user based on the detected attribute information, the resolution converting process is performed on each of the areas to thereby modify the image data GD (Step 3). In this process, for example, as described above, a resolution conversion is performed on the extracted photograph image SG so as to apply thereto the original size of the graphics image ZG, and a resolution conversion is performed on the extracted graphics image ZG so as to apply thereto the original size of the photograph image SG. Subsequently, an image based on the image data GD that has been modified by the resolution converting process is printed on a recording medium (Step 4).

According to the image forming apparatus 1 of this embodiment, it is possible to enlarge or reduce an image per area, which is desired by a user, from among the text image MG, the photograph image SG, and the graphics image ZG included in the document GE.

As described above, when the photograph image SG of the document GE is to be enlarged and duplicated and at the same time the graphics image ZG can be reduced and duplicated in view of a matter of importance, it is possible to apply the original size and forming position of the graphics image ZG to the photograph image SG to enlarge the image per area, that is, only the photograph image SG, and duplicate the result. On the other hand, it is also possible to apply the original size and forming position of the photograph image SG to the graphics image ZG and, thereby, to reduce the image per area, that is, only the graphics image ZG, and duplicate the result.

Additionally, when the user wishes to enlarge the photograph image SG as large as possible but within a printable area of the paper, the user can enlarge the image per area, that is, only the photograph image SG and duplicate the resultant image on a separate paper.

In this way, by duplicating the image per area, it is possible to prevent images other than the desired image from being also enlarged or reduced, thereby resulting in a copy that is easy to view.

Furthermore, there is no need to adjust the position or the magnification when the document GE is placed on a document table, thereby largely reducing the work incurred by the user.

For these reasons, according to the image forming apparatus 1, it is possible to easily and appropriately edit and duplicate the text image MG, the photograph image SG, and the graphics image ZG of the document GE.

Other Embodiments

In the embodiment described above, although the photograph image SG is enlarged based on the printable area of the paper when the photograph image SG is printed on a separate paper, the user may specify the enlargement ratio within a printable range.

It is also possible to embed the area attribute information RJ and the position information IJ of individual images included in the original copy HSt into the copy HSt on which the resolution conversion has been performed.

In the embodiments described above, the overall configuration of the image forming apparatus 1 or the configurations of various portions thereof, the content to be processed, the processing sequence, and the like may be altered as required in accordance with the subject matter of the present invention. Even in such a case, it is also possible to produce the peculiar and particular effect as discussed above.

What is claimed is:
1. An image forming apparatus comprising:
  a reading portion that reads a document and generates image data;
  an information detecting portion that detects, from the image data generated by the reading portion, attribute information about areas divided in accordance with a type of an image;
  a modifying portion that modifies the image data for each of the areas by performing a resolution converting process on the image in accordance with instructions that are provided by a user based on the attribute information detected by the information detecting portion;
  a printer that prints an image based on the image data modified by the modifying portion on a recording medium;
  wherein said image is at least two images; and
  in the resolution converting process, the modifying portion modifies the image data by applying an original size and an original forming position of one of the two images to other of the two images for the other of the two images to be formed and applying an original size and an original forming position of the other of the two images to said one of the two images for said one of the two images to be formed.

2. The image forming apparatus according to claim 1, wherein the attribute information includes area attribute information indicative of an attribute of the image and position information indicative of a position of the image on the recording medium.

3. The image forming apparatus according to claim 2, wherein the area attribute information includes photograph information indicating whether or not the image is a photograph image, graphics information indicating whether or not the image is a graphics image, and text information indicating whether or not the image is a text image.

4. The image forming apparatus according to claim 1, further comprising:
  an area discriminating portion that, based on the image data, generates area attribute data indicating a text area, a photograph area, and a graphics area; and
  an information embedding portion that embeds the attribute information in the image data,
  wherein the information embedding portion embeds the attribute information based on the area attribute data generated by the area discriminating portion.

5. The image forming apparatus according to claim 4, wherein the information embedding portion embeds the attribute information in the image data in a form of a background pattern.

6. The image forming apparatus according to claim 1, further comprising
  an information embedding portion that embeds the attribute information in the image data,
  wherein the information embedding portion embeds the attribute information based on area attribute data that is inputted externally and indicates a photograph area, a graphics area, and a text area.

7. An image forming method comprising the steps of:
  reading a document and generating image data;
  detecting, from the image data thus generated, attribute information about areas divided in accordance with a type of an image;
  modifying the image data for each of the areas by performing a resolution converting process on the image in accordance with instructions that are provided by a user based on the attribute information thus detected;
  printing an image based on the image data thus modified on a recording medium;
  wherein said image is at least two images; and in the resolution converting process, the image data is modified by applying an original size and an original forming position of one of the two images to other of the two images for the other of the two images to be formed and applying an original size and an original forming position of the other of the two images to said one of the two images for said one of the two images to be formed.

8. The image forming method according to claim 7,
wherein the attribute information includes area attribute information indicative of an attribute of the image, and position information indicative of a position of the image on the recording medium.

9. The image forming method according to claim 8,
wherein the area attribute information includes photograph information indicating whether or not the image is a photograph image, graphics information indicating whether or not the image is a graphics image, and text information indicating whether or not the image is a text image.

10. The image forming method according to claim 7, further comprising the steps of:
generating area attribute data indicating a text area, a photograph area, and a graphics area based on the image data; and
embedding the attribute information in the image data based on the area attribute data thus generated.

11. The image forming method according to claim 10,
wherein, in said step of embedding the attribute information in the image data, the attribute information is embedded in the image data in a form of a background pattern.

12. The image forming method according to claim 7, further comprising a step of
embedding the attribute information in the image data based on area attribute data that is inputted externally and indicates a photograph area, a graphics area, and a text area.

13. A non-transitory computer-readable storage medium storing a program for use in a computer that performs the steps of:
reading a document and generating image data;
detecting, from the image data thus generated, attribute information about areas divided in accordance with a type of an image;
modifying the image data for each of the areas by performing a resolution converting process on the image in accordance with instructions that are provided by a user based on the attribute information thus detected;
printing an image based on the image data thus modified on a recording medium;
wherein said image is at least two images; and
in the resolution converting process, the image data is modified by applying an original size and an original forming position of one of the two images to other of the two images for the other of the two images to be formed and applying an original size and an original forming position of the other of the two images to said one of the two images for said one of the two images to be formed.

14. An image forming apparatus comprising:
a reading portion that reads a document and generates image data;
an information detecting portion that detects, from the image data generated by the reading portion, attribute information about areas divided in accordance with a type of an image;
a modifying portion that modifies the image data for each of the areas by performing a resolution converting process on the image in accordance with instructions that are provided by a user based on the attribute information detected by the information detecting portion;
a printer that prints an image based on the image data modified by the modifying portion on a recording medium;
an area discriminating portion that, based on the image data, generates area attribute data indicating a text area, a photograph area, and a graphics area;
an information embedding portion that embeds the attribute information in the image data;
wherein the information embedding portion embeds the attribute information based on the area attribute data generated by the area discriminating portion; and
wherein the information embedding portion embeds the attribute information in the image data in a form of a background pattern.

15. An image forming method comprising the steps of:
reading a document and generating image data;
detecting, from the image data thus generated, attribute information about areas divided in accordance with a type of an image;
modifying the image data for each of the areas by performing a resolution converting process on the image in accordance with instructions that are provided by a user based on the attribute information thus detected;
printing an image based on the image data thus modified on a recording medium;
generating area attribute data indicating a text area, a photograph area, and a graphics area based on the image data;
embedding the attribute information in the image data based on the area attribute data thus generated; and
wherein, in said step of embedding the attribute information in the image data, the attribute information is embedded in the image data in a form of a background pattern.

* * * * *